United States Patent Office 3,573,155
Patented Mar. 30, 1971

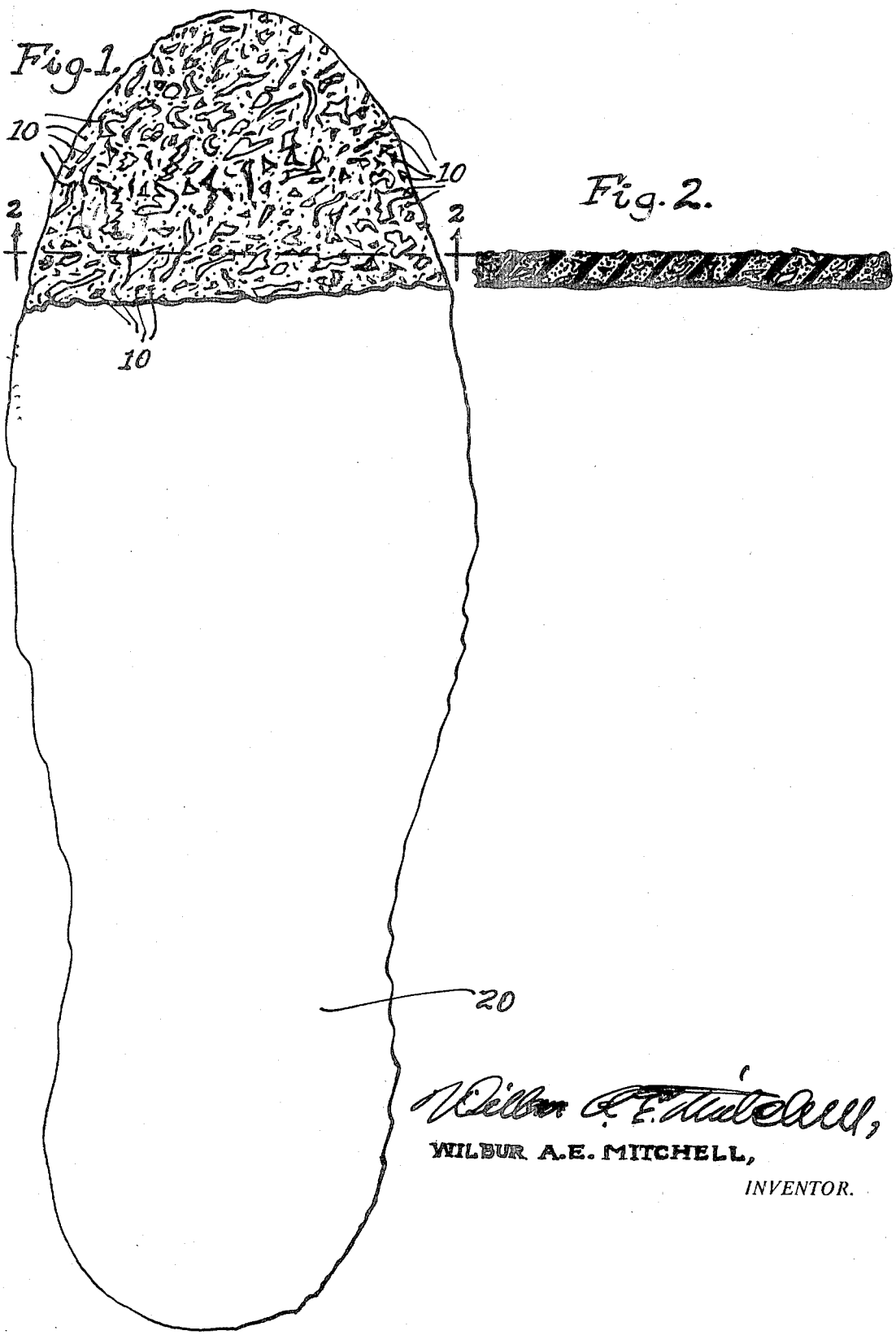

3,573,155
NONSLIP ARTICLE OF MANUFACTURE
Wilbur A. E. Mitchell, Greeley, Colo., assignor to
Mitchell Tackle, Inc., Greeley, Colo.
Filed May 17, 1968, Ser. No. 730,181
Int. Cl. A43b 13/22; B32b 5/16; C09k 3/14
U.S. Cl. 161—162                                            8 Claims

ABSTRACT OF THE DISCLOSURE

A nonslip rubber-like article of manufacture, comprising an undercured and substantially soft-rubber-like dough mass, and aluminum pieces, shavings and particles impregnated throughout the mass, in comparison to a full curing of the mass thereof.

---

This invention pertains generally to rubber or similar products, which slip when wet and on ice, such as foot wear and fishing boot soles, and flooring.

Soles of such type foot wear have been heretofore made of relatively hard fully cured rubber, or the like, so far as known. Fully cured conventional fishing boot soles are so hard that on use the soles will not adequately bend over stones or objects on which the wearer walks, accentuating the wet rubber slippable characteristic thereof. Such conventional boot soles, as far as known, are conventionally fully cured during manufacture, under about 500 pounds of pressure at 300 degrees or more of heat for 30 minutes or more, resulting in such hardness that in use the sole is too stiff and resistive to indentation, among others.

In the western United States, the rivers and streams develop a thick moss growth in late summer on the rocks in the stream beds, and that moss becomes a slippery adherent mass on each by August or about Labor Day each year. Then conventional boot soles are most inadequate for the fisherman to be able to stand up in such mossy stream beds, without the danger of slipping and falling, and resultant injury. In an endeavor to overcome that slipping danger, in fishing streams then, fishermen sometimes affix felt on or over the soles of their boots, but same are quite expensive and too short lived on much use. Various brass abrasives and quartz roughages or grits have been tried as ingredients in fully cured soles of fishing boots and footwear, without success, as far as known.

The inherent non-slippable-when-wet characteristic of aluminum shavings, as the roughage substance to be used in such soles, has never before been used, as far as known, before my invention. Further, my novel process of undercuring my aluminum shaving impregnated rubber mass soles, so as to have a soft pliable sole, in combination with said aluminum characteristic, has never before, so far as known, been used.

I use discarded aluminum shavings particles and sawdust, such as of an aluminum storm window or door factory. I impregnate those small aluminum saw shaving particles, of irregular shapes, configurations and sizes, into uncured soft rubber, and then I considerably undercure that impregnated rubber dough mass, in the making of soles therefrom. I do not fully cure that mass, so as to have a comparatively soft sole with those aluminum particles therein and partially exposed at the surface thereof. I utilize the advantage of the inherent non-slippable-when-wet characteristic of the aluminum shavings, to assist the fisherman in walking or standing on slippery stones, when using boots having my soles, as small edges of the aluminum shavings are exposed at all times and accentuated by the natural wearing or abrasion of the sole on use. In curing my novel soles, I use only a comparatively small amount of heat and pressure, in comparison to that conventionally used in making fully cured conventional rubber boot or foot wear soles, so as to have a novel soft and bendable aluminum shaving impregnated sole. I have found it is important that the sole to be soft enough to bend over and, in effect, creep over, the stones or objects in the stream bed, which the fisherman, wearing boots having my soles, walks on, for thereby permitting the aluminum particles in my sole to grip against such stones. Then the non-slippable-wet aluminum characteristic helps the fisherman stand up, as he wades the stream, on such stones.

I provide a novel combination of considerably undercured or soft, aluminum-shavings-impregnated mass rubber boot sole. Heat conductivity of the mass varies with the type of rubber stock used, or with the constituency thereof, and whether uncured raw rubber is used. The heating of the interior of my aluminum shavings impregnated rubber mass assists in effecting the under-curing thereof, in accomplishing the desired state of a substantial undercuring, meaning, the heat retaining characteristic of the aluminum shavings, once heated, is a factor. In the making of my novel soft sole, I substantially undercure my aluminum shaving impregnated rubber mass, to allow for the resulting stiffening characteristic of the rubber, when used on the fisherman's boot in the normal comparative low temperature of the water of the stream or lake, so as not to have that stiffening thereof overcome the soft undercuring benefit or characteristics of my impregnated sole. My novel sole does not have the extent of the problems of deterioration by weathering and sunlight, of cracking, oxidation and loss of strength, due to my novel use of a considerably undercured aluminum shaving impregnated rubber mass, thereby resulting in a greater length of life to the mass, as the more the curing the greater those deterioration problems.

I suitably impregnate the aluminum shavings throughout the rubber by either of several methods. One is by using a suitable rubber press roll mill machine, by press-mixing about four parts of about 25 durometer natural uncured rubber, or other suitable uncured rubber stock, such as tire re-tread camel-back, to one part of the aluminum shavings by volume, making that impregnated uncured mass about ⅜ inch thick. I cut the desired individual sole out of that mass. Then, instead of the conventional method of fully curing that new sole mass with about 300 degrees of heat under several hundred pounds of pressure for not less than 30 minutes, I considerably undercure the mass and utilize the heat retaining characteristic of the impregnated aluminum shavings, in the new impregnated dough sole mass, by then applying only 240 degrees of heat under not over 20 pounds of pressure and for not over 8 minutes. I use a suitable thermostat controlled electric heater plate. My novel process is just long enough in time to cause a heating to that temperature of the aluminum shavings within the new sole mass, and then the exterior electric plate heat being removed, those shavings within the mass substantially retain heat, in decreasing temperature, for about another 8 minutes, thus by that decreasing retained heat of the shavings assisting in the semi-curing of the interior of the mass, without overcuring the exterior thereof, due to the natural lack of thermal conductivity of the rubber.

A ¼ inch deep sole mould may be used in the process formation of the desired soles, as just explained, if desired. When a sole mould is used, it will be understood that sufficient of the aluminum impregnated dough mass, as explained, is placed therein to adequately fill it and such 240 degrees of hot plate heat applied thereover under not over 20 pounds of pressure and for not longer than 8 minutes. Then the mass is then removed from the mould and allowed to so cool, which takes another approximate 8 minutes, as explained. Sufficient of the impregnated mass is placed in the mould, when used, to allow for inherent shrinkage on cooling to have a resultant ¼ inch thick sole. After the sole is so formed, then it is ready to be suitably cemented to the desired boot sole, after the latter is smoothed and cleaned in preparation therefor, by conventional means, as by cold rubber cement application to both one side of the sole and the under sole surface of the boot.

It is a principal object of my invention to provide a nonslip pliable rubber-like mass product having aluminum shaving particles impregnated throughout the mass.

Another object of my invention is to provide the novel process of impregnating such aluminum shavings into a pliable uncured rubber-like composition or uncured rubber dough formed mass, and then only substantially considerably undercuring that dough mass by application of only a relative small amount of external heat and pressure for a limited period of time thereto, in comparison to a conventional full curing thereof, and in the undercuring thereof utilizing the heat retention characteristic of the said shavings in the impregnated mass, by utilizing that heat so retained by those shavings, after removal of the applied heat thereto and in the cooling of the undercured mass, in so effecting the desired undercuring of the mass after the removal of the applied heat to the mass, for the forming of a substantially soft and considerably undercured aluminum shaving impregnated product or foot wear sole.

Many other objects will be apparent to those skilled in the art, from the foregoing, and from the following detailed explanation:

In the drawing:

FIG. 1 is a partial plan view of my under-cured and semi-soft aluminum impregnated rubber sole; and FIG. 2 is a cross-sectional view taken on the line 2—2 thereof, looking in the direction of the arrows.

I suitably knead about four parts of preferably raw uncured rubber and one part of aluminum so-called saw-shavings together into an impregnated dough-like mass about ⅜ inch thick, when soles are to be formed, so that the shavings 10 are substantially evenly distributed or molded throughout the resultant uncured dough-like sheet mass. Those shavings 10 are of irregular shapes and sizes and measure from about 1/256 of an inch to about ½ of an inch. I use a rubber roller mill having suitable rollers spaced about ½ to ⅜ of an inch evenly apart for the purpose, running about 25 durometer or less test suitable uncured rubber stock with such aluminum shavings sprinkled thereon several times through that mill to accomplish the desired aluminum impregnated mixture throughout the resultant mass in that sheet form. In the making of fishing boot soles, 20, I usually then cut out the individual soles from that uncured aluminum shavings impregnated rubber mass sheet, and apply an electric thermostat controlled heating plate, holding the heat thereof at not over 240 degrees, and maintain that heat on the impregnated new rubber sole mass at not over 20 pounds of pressure and for not over 8 minutes. Then I take the new sole off the hot plate and place the sole aside to cool. The shavings within the new sole dough mass, by that 200 degree heated 8 minute 20 pound pressure semi-curing process, are thereby heated to substantially that temperature, before that sole is removed from that hot plate and placed aside to cool. The heated shavings in the newly formed sole heated mass, on removal of the new sole from the hot plate, cool quite slowly, due to the slow thermal heat conductivity of the rubber, taking about 8 minutes to cool. It will thus be seen that during that cooling there is that 8 minute period of slowly decreasing heat of and from the internal aluminum shavings in the new mass. Said decreasing heat acts to further partially cure the internal rubber portion of the new aluminum impregnated rubber sole, and that is why I originally apply heat to the new sole for only the 8 minute period by the electric plate heating element, as that subsequent cooling period is a part of the desired overall under-curing heat process period. My new undercured rubber aluminum shaving impregnated sole, in terms of durometer hardness, is not over 30 on the durometer scale, or comparatively substantially soft, but formed as a sufficiently adhesive mass to hold the aluminum shavings therein and thereto. The amount or proportionate softness of my resultant sole product can be appreciated when it is remembered that conventional full curing of rubber soles, so far as known, is accomplished by application of about 500 pounds of pressure by 300 degrees heat for at least 30 minutes; whereas, I use not over 20 pounds of pressure at not over 240 degrees and for not over 8 minutes initial heat application, and with no outside heat application or pressure thereafter, and the cooling or decreasing heat period from that 240 degrees to about zero degrees occurring over an 8 minute period thereafter.

I do not wish to be limited to the roller-press machine method of impregnating the aluminum shavings into the raw uncured rubber mass, prior to the substantial undercuring thereof, as heretofore mentioned. There are other methods I use of accomplishing that shaving impregnation.

Another method I sometimes use is to take the uncured soft rubber stock and substantially liquify it by application of a suitable solvent, such as by use of carbon disulfide for a few hours, and then suitably mixing a suitable quantity of the aluminum shavings, as explained, into that liquified resultant stock mass. I then place a sufficient quantity of that uncured-liquified-shavings-dough mass in a suitable sole mould, about ¼ of an inch deep, formed of the shape of a boot sole, for example. Then I apply not over 240 degrees of heat to that mould having that mixture mass therein for about 8 minutes. Then I immediately remove that heated new sole mass from the mould and set it aside to cool, which cooling takes substantially another 8 minute period as explained. The new sole so made is also of the desired suitable aluminum-shaving-impregnated substantially soft or undercured novel type, having a durometer testing of substantially not over 25. In cases where the uncured rubber stock is comparatively hard, as usually occurs from prolonged storage, I prefer the latter liquifying-impregnated method, just explained, to assure an even distribution of the aluminum shavings throughout the soft rubber stock mass in the preparation of the mass for under-curing, as explained.

It will be obvious that the thicker the newly formed initial stage impregnated mass, just prior to being undercured by heat application, as explained, then, substantially proportional to the extent of that uncured thickness will be the duration of the 240 degree under-curing heating process. For example, to make a ½ inch thick sole, the new aluminum shavings impregnated mass should be subjected to about 12 minutes of the 240 degrees heat for my resultant soft under-curing thereof, and a lesser thickness sole of about ⅛ of an inch should not be subjected to an under-curing heat of over about 5 minutes of 240 degrees heat. I have found the application of pressure with that under-curing heat application, to the shaving impregnated uncured mass, to be relatively unimportant in the case of footwear soles, and that a satisfactory under-curing can be accomplished by the heat application alone without the pressure, though a little pressure makes a better appearing finished product. Thus in the making of sheets of floor covering of my novel aluminum impregnated undercured material, there should be a little pressure applied for a resultant smoother surface, with the aluminum impregnated particles partially exposed thereon. In the case of boot or footwear soles, an uneven surface may be preferable at times, as shown.

I thus have a comparatively soft, considerably undercured aluminum shaving impregnated rubber sole for use with a fishing boot, or other outdoor footwear used to keep the feet dry. The sole may be applied by application of a suitable conventional non-vulcanizing cement adhesive to the under-portion of a boot or footwear. My novel sole is sufficiently soft to bend or creep onto, over and in adherence to the uneven contour of stones or objects stepped on by the wearer, when same are encountered, and such adherence is accentuated by the aluminum shavings of the sole.

I have found in addition to aluminum shavings having an inherent nonslippable characteristic on a wet or ice surface, that the irregular size, contour and shape of my aluminum shavings have another characteristic, namely that of being substantially adherent to some extent to liquefied rubber. Thus during the cooling process of my rubber mass, during the making of my novel aluminum impregnated under-cured product, heretofore explained, that characteristic of the aluminum shavings helps to secure the shavings of that mass as an integral part of the rubber dough mass or new sole on that cooling.

In the substantial undercuring process, as explained, the application of heat is not a necessity, though preferable for a quick result. It is to be understood that the uncured dough like-rubber mass, having suitable aluminum shaving metal particles impregnated therein prior to curing, may be partially and sufficiently undercured for my purpose, into a resultant substantially soft and substantially undercured product mass, solely by the application of reasonable pressure of about 100 pounds thereto for about 20 minutes without any heat application, when the resultant product is not intended for immediate use, as in the case in the course of trading when the product will have to be stored for a period of anywhere from 60 to 180 days before ultimate customer sale and use.

During wear and natural abrasion of the under exposed surface of my novel aluminum shaving impregnated undercured soft rubber sole, the aluminum particles thereof come into closer contact with the surface of the rocks on which pressed by the wearer, than would occur were those soles hard and unbendable. Thus the exposed aluminum shavings act the better to grip the surface on which the wearer steps, accentuated by the substantial creeping action of the rubber of the sole as a result of its softness. Further, where my novel sole is used on fishing boots, the aluminum shavings therein by their sharp exposed edges act to held prevent slipping of the sole on those rocks, and also since aluminum is inherently non-slippable when wet. As my novel boot sole wears, the aluminum shavings imbedded therethrough are exposed at the surface of the sole and their irregular size, shape and configuration also act to effect an adherence to the rocks walked on by the wearer.

It will be seen that many other uses, in addition to boot soles, can be had of or for my novel product, of forming a considerably under-cured aluminum shaving impregnated substantially soft rubber-like mass, such as using sheets thereof for flooring for boats, floor covering and industrial flooring, among other uses, to prevent slipping.

When I speak heretofore of my novel product as being substantially soft, I do not wish to be entirely limited thereby—simply having spoken of that characteristic with reference to the preferred embodiment explained of footwear soles. That softness, as explained, though, I have found advantageous in many other uses, such as for padding for throw rugs. That softness is to be understood as being measurable on the completion of the undercuring process explained, and is measurable by durometer testing as mentioned. There, however, will be times, in the use of my novel process or method of manufacture, of mixing or impregnating aluminum shaving particles with a rubber-like dough mass of uncured material, capable of being cured by heat application thereto, and applying heat thereto, to only substantially undercure the mass. I thereby have a relatively soft product capable of holding the shavings in suspension therein and yet permitting the shavings to be exposed on the surfaces thereof, when, as mentioned, I apply a little pressure during that undercuring process. It is to be understood that the extent or degrees of the applied heat and duration of that applied heat and the extent of any pressure applied during the undercuring heat application thereto all affect the extent of the curing of the mass. As explained, floor covering will require a little pressure during that process making thereof, and, also according to the use to which the covering is to be subjected, and with that pressure, more heat application may be required, to have the desired increased amount of resultant hardness, over that as explained with relation to footwear soles use, but yet not to have a fully cured product, within the teaching hereof.

Further, within the teaching hereof, it is to be understood that my basic concept teaching is the impregnation of aluminum particles with a dough-like pliable formable mass in the formation of the desired product, whether that product is cured solely by kneading or pressure application thereto, or solely by heat application thereto to cause undercuring or full curing thereof, or simply is so-called formed suitably by aging or exposure to the atmosphere, or by any combination thereof, for any one of numerous uses in having a resultant aluminum-particle-impregnated-non-slip pliable soft product.

Since many changes and modifications may be made in the preferred embodiment of my invention herein disclosed within the spirit and teaching hereof, I wish to be bound only by the hereunto appended claims.

What I claim and desire to secure by Letters Patent is:

1. The method of forming a soft, resilient nonslip article which comprises the use of an elastomeric matrix having the characteristics of uncured rubber stock of approximately 25 durometer and discarded waste aluminum shavings of irregular forms having a length varying from $\frac{1}{256}$-inch to $\frac{1}{2}$-inch and which includes the steps of:
    (a) dispersing said shavings throughout the matrix;
    (b) forming the matrix into the article; and
    (c) partially curing the matrix to produce the article of a hardness of approximately not over 30 durometer.

2. The method of forming a soft, resilient nonslip article as defined in claim 1 and wherein the elastomer is defined as being of natural rubber stock, and further by the partial curing being by application of not over 240 degrees of heat with not over 20 pounds of pressure and for not over 20 minutes.

3. The method of forming a soft, resilient nonslip article as defined in claim 1 and further characterized by the elastomer being of camelback rubber.

4. The method of forming a soft, resilient nonslip article as defined in claim 1 and characterized further by the definition of the dispersing of the waste aluminum shavings being by a kneading of said shavings into the matrix.

5. A soft, resilient nonslip article comprising a matrix of an elastomer having the characteristics of a partially cured rubber-like stock of a hardness of approximately 30 durometer and aluminum waste shavings of irregular form having a length varying from $\frac{1}{256}$-inch to $\frac{1}{2}$-inch interspersed within the matrix with portions of some of the shavings being exposed at the surface of the article whereby to assist in the nonslip characteristics of the aluminum shavings when wet.

6. A soft, resilient nonslip article as defined in claim 5 and defined further by the elastomer matrix having the characteristics of partially cured natural rubber stock.

7. A soft, resilient nonslip article as defined in claim 5 and defined further by the matrix being an elastomer having the characteristics of camelback rubber.

8. A soft, resilient nonslip article as defined in claim 5 and characterized further by the definition of said waste aluminum shavings, being discarded shavings, and wherein said aluminum shavings are not less than 25% by volume interspersed within said matrix.

References Cited
UNITED STATES PATENTS

| | | | |
|---|---|---|---|
| 1,428,356 | 9/1922 | Brown | 36—32 |
| 1,507,844 | 9/1924 | Mason | 36—59(B) |
| 1,591,018 | 7/1926 | Cutler | 36—59(B)UX |
| 1,679,272 | 7/1928 | Schultz | 36—59(B) |
| 2,084,784 | 6/1937 | Stahl | 36—59(B) |
| 2,143,897 | 1/1939 | Oriola | 260—41.5UX |
| 2,171,438 | 8/1939 | Tarbox | 156—114 |
| 2,336,388 | 12/1943 | Beebe | 161—243X |
| 2,643,234 | 6/1953 | Backus | 260—41.5X |
| 3,344,094 | 9/1967 | Gaugue | 260—41.5X |
| 3,475,205 | 10/1969 | Byers | 260—41.5X |

JOHN T. GOOLKASIAN, Primary Examiner

G. W. MOXON II, Assistant Examiner

U.S. Cl. X.R.

36—32, 59; 106—38; 161—168; 260—41.5